United States Patent [19]
Cadiou

[11] 3,791,475
[45] Feb. 12, 1974

[54] POWER STEERING APPARATUS
[75] Inventor: Jean Georges Cadiou, St. Cloud, France
[73] Assignee: Societe Anonyme Automobiles Citroen, Paris, France
[22] Filed: Mar. 28, 1972
[21] Appl. No.: 238,845

[30] Foreign Application Priority Data
Apr. 2, 1971  France.................... 71.11672

[52] U.S. Cl.................... 180/79 R, 74/89, 91/382
[51] Int. Cl................................................ B62d 5/06
[58] Field of Search.......... 180/79.2 R; 91/368, 382; 74/388 PS, 495, 89

[56] References Cited
UNITED STATES PATENTS

| | | | |
|---|---|---|---|
| 1,910,600 | 5/1933 | Fitch | 180/79.2 R |
| 3,183,992 | 5/1965 | Brueder | 180/79.2 R |
| 2,362,930 | 11/1944 | Robbins | 180/79.2 R |
| 2,931,239 | 4/1960 | Dietrich | 180/79.2 R |
| 2,964,017 | 12/1960 | Hruska | 180/79.2 R |
| 3,171,298 | 3/1965 | Biabaud | 180/79.2 R X |

FOREIGN PATENTS OR APPLICATIONS
760,968  11/1956  Great Britain ............... 180/79.2 R

*Primary Examiner*—Kenneth H. Betts
*Assistant Examiner*—John A. Pekar
*Attorney, Agent, or Firm*—Brisebois & Kruger

[57] ABSTRACT

Power steering apparatus comprises a steering shaft, an intermediate shaft connected to actuate the steering linkage and connected to the steering shaft through a lost motion connection, fluid-operated means for actuating the steering linkage, and a distributor for controlling said actuating means. The distributor is actuated in response to relative angular displacement between the steering and intermediate shafts and means are provided for amplifying the effect of said displacement on the distributor. The power steering apparatus is associated in a single casing with means for automatically straightening the steered wheels of the vehicle.

12 Claims, 4 Drawing Figures

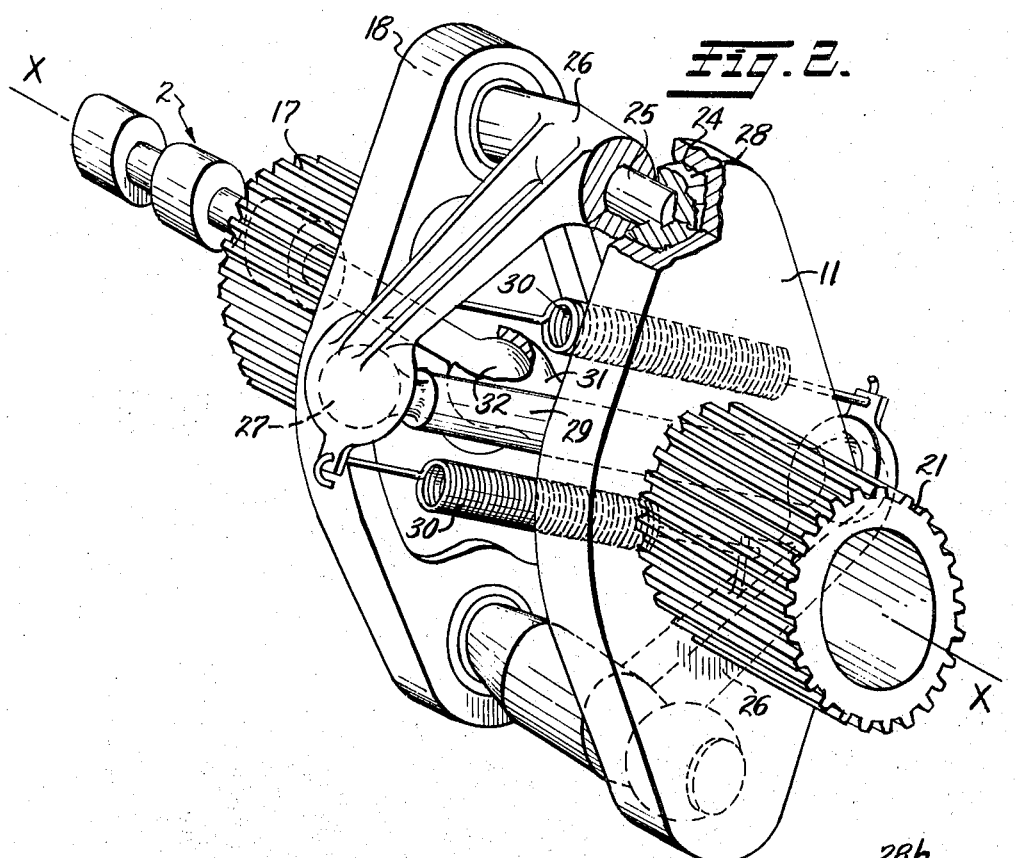
Fig. 2.
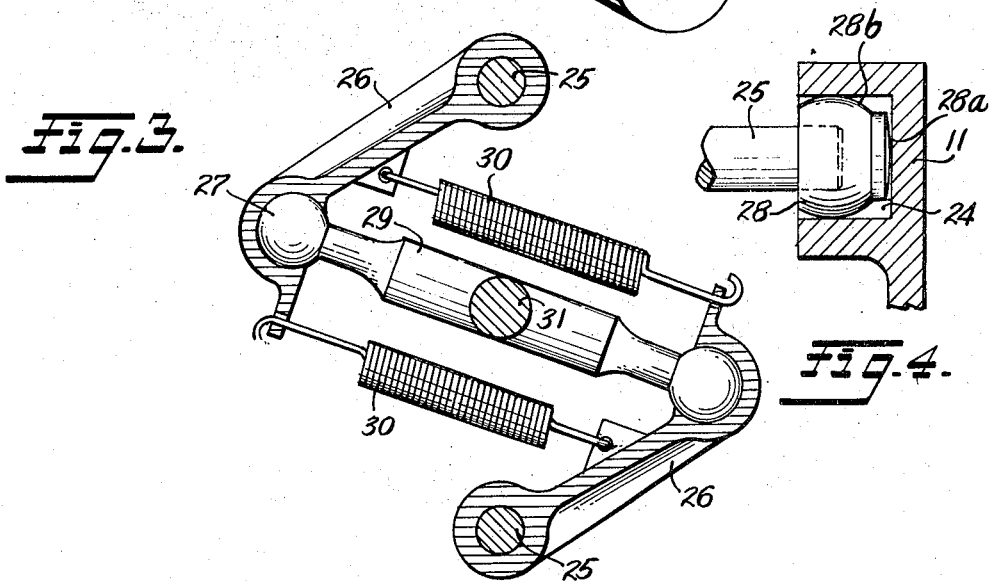
Fig. 3.
Fig. 4.

POWER STEERING APPARATUS

SUMMARY OF THE INVENTION

This invention relates to power steering apparatus for vehicles, of the type comprising a hydraulic cylinder adapted to actuate the steering linkage, a source of fluid pressure, a slidable valve member for distributing fluid under pressure to the hydraulic cylinder, which valve member is hydraulically balanced and axially translated by means responsive to the angular displacement between a steering column and a shaft connected to the steering linkage, these two shafts being mechanically connected to rotate together, with a certain amount of play permitted therebetween.

Power steering apparatus is, in general, intended to decrease the amount of effort required of the driver while at the same time assuring a return to a straight ahead direction, in dependence on the force exerted by the auxiliary hydraulic cylinder and/or on the speed of the vehicle, or on other parameters.

The first object of the invention is to improve the sensitivity, precision, and fidelity of power steering apparatus of this type.

A second object of the invention is to provide power steering apparatus in which the controls for the pressure-fluid distributor and a device for returning the wheels to their straight-ahead position are combined in a single casing. This device acts on the steering column shaft and is responsive to the angular position of the wheels and preferably to the speed of the vehicle as well.

Another object of the invention is to provide a unitary compact power steering assembly which may be incorporated without modification into different control systems suitable for both light and heavy vehicles.

Power steering apparatus according to the invention is essentially characterized by the fact that the means for controlling the distribution valve comprise, on the one hand, two members which rotate about a common geometric axis, which are connected to rotate together by means for driving them at the same ratio. One member is connected to the steering column and the other to a shaft connected to the steering linkage. The apparatus also comprises as an essential feature means connected to the distribution valve for converting the relative angular displacement between the rotatable members into translational movement.

The means for rotating the rotatable members are preferably geared up to make it possible to increase the distance travelled by the valve gear member for a given angular displacement between the two shafts, and thus increase the sensitivity of the control. Advantageously, the steering column shaft and the shaft connected to the steering linkage are aligned and the common axis of the rotatable members is parallel.

According to another characteristic of the invention the valve member is mounted in alignment with the common axis of the rotating members and translated by the pivot-carrying ends of at least two levers, each of which levers is attached to a rod pivotally attached at its end to each of the rotatable members by ball and socket joints comprising at least one spherical bearing surface, each of the two rotating members having a surface facing the other in which the sockets of said ball and socket joints are formed, said rods being parallel, in the absence of angular displacement, to the axis of the rotatable members.

In addition, the pivotal connection at the end of each lever is a ball and socket joint positioned, in the absence of angular displacement, at a distance from the plane defined by the axis of the rod to which it is attached and by the axis of the rotatable members which is greater than the distance separating the centers of the pivotal connections of said rod to each of said rotatable members.

Preferably the ball and socket joint at the end of each lever is centered in the median plane of the rod to which it is attached. Furthermore, the rods are of equal length and their ball and socket joints are centered in each of the rotatable members in a single plane perpendicular to the axis of these members.

Moreover, the axes of the rods and the centers of the ball and socket joints on the ends of the levers are equidistant from the axis of the rotating members.

It is advantageous to provide a connecting member pivotally connected to one end of each lever, said connecting member being pivotally connected to the valve member by means passing through a hollow shaft on which one of said rotatable members is mounted to turn. In a preferred embodiment, this connecting member is a lever arm connected at three points which are not in alignment and are provided with ball and socket joints. One point is connected to the end of the valve member and the other two are connected to the levers associated with the rods, which are then two in number, and symmetrically positioned with respect to the common axis of the rotatable members.

Finally the ball and socket joints for each rod may be provided with two part-spherical bearing surfaces, one of which is centered on the end of the rod and the other of which is a part-spherical ring centered near the end of the axis of the rod.

These arrangements permit an increase in the distance travelled by the valve member for a given angular displacement between the steering column and the shaft connected to the steering linkage, while simultaneously ensuring that the valve member is actuated without play and without flexing.

The invention will be better understood from a study of the following description, with reference to the accompanying drawings, of a preferred embodiment of the invention. In these drawings:

FIG. 2 is a perspective view showing the rotatable members and their connection with the valve member;

FIG. 3 is a detail view showing one form of the ball and socket connection for the three-point levers; and FIG. 4 is a detail view showing a ball and socket connection for one of the shafts carrying a lever.

Figure 1:
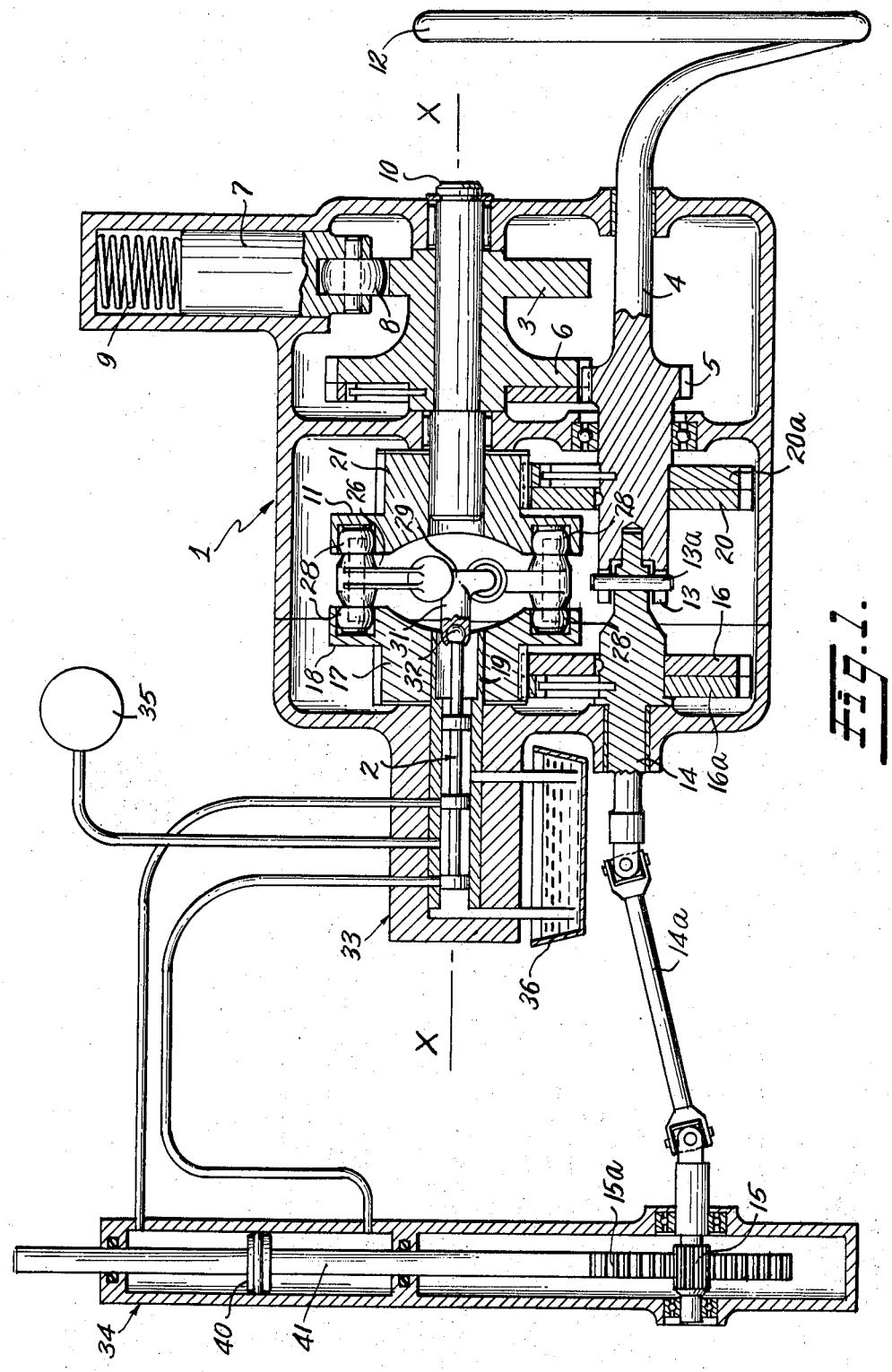
FIG. 1 is a schematic axial sectional view of the power steering apparatus according to the invention, taken through the casing holding the members controlling the valve member of the distribution valve, and the return means.

The illustrated embodiment represents a preferred embodiment of the invention which comprises a single casing 1 holding the means for controlling the valve member 2 of the distribution valve and a device for returning the steering gear to its straight-ahead position, which device comprises a heart-shaped cam 3, connected to be rotated by the steering shaft 4 through speed-multiplying gearing (pinions 5,6), and subjected to radial force by a pressure member 7 carrying a roller 8.

The pressure member may be subjected to hydraulic pressure dependent upon parameters selected to control the return movement, for example the speed of the vehicle. Such a device is described in U.S. Pat. No. 3,171,298.

In the example described, the force exerted on the roller is supplied by a spring 9. The relationship between the pinions 5, 6 is so selected that the cam can turn only through an angle less than 360°.

Preferably a first rotatable member 11, driven by the steering column shaft 4, and the cam 3 of the return device are mounted on the same shaft 10. Of course each of these members may be mounted to rotate on the shaft 10 or only one of them may be so mounted.

The conventional components of power steering apparatus have been schematically indicated on FIG. 1. The steering wheel 12 turns the steering column shaft 4, which shaft carries, at the end thereof remote from the steering wheel 12, a member 13 which drives the shaft 14, which is connected to the steering linkage by a mechanism which converts rotary movement into translational movement to control the direction of the wheels. A system comprising a pinion 15 and rack 15a has accordingly been illustrated. The shaft 14 may drive the pinion 15 through an intermediate shaft having at each end a universal joint, schematically represented at 14a.

The shaft 14 enters the casing 1 in alignment with the shaft 4 and carries at its inner end a member 13 driven by the member 13a on the steering column shaft 4. A certain angular play is provided between the members 13 and 13a.

A pinion 20 is keyed to the steering column shaft 4, and engages a pinion 21 fixed to the first rotating member 11. Similarly a pinion 16 is keyed to the shaft 14 and engages a pinion 17 fixed to a second rotatable member 18 mounted on a hollow shaft 19 in axial alignment with the shaft 10.

The pairs of pinions 16, 17 and 20, 21 the gearing ratios of which are identical, may be provided with a device for taking up the play therebetween consisting, for example, in a conventional manner, of a pinion 16a and a pinion 20a having teeth identical to those of 16 and 20, and connected to the shafts 14 and 4, respectively, by torsional resilient means, while the pinions 16 and 17 are keyed to their respective shafts.

It will thus be seen that the rotational members 11 and 18, which turn about the same geometric axis of rotation, are driven respectively by the shafts 4 and 14 so that a certain relative angular displacement results, due to the angular play between the members 13, 13a rotatably coupling the shafts 4, 14. Each assembly comprising a pinion and rotatable member, (17, 18 and 21, 11) is identical, and they are symmetrically positioned with respect to a plane normal to the axis XX, with the pinions on the outside. On the surface of each rotatable member 18, 11 normal to the axis XX and remote from its pinion 17, 21, are the two sockets 24 of ball and socket joints. The sockets on each member are symmetrically positioned with respect to the axis XX, and each socket on one of these rotatable members is, in the absence of angular displacement, aligned with a socket on the other rotatable member. The sockets are cylindrical and have a flat bottom.

Each of two identical cylindrical shafts 25 (FIG. 2), carries a lever 26 which comprises, centered on a median plane transverse to the shaft 25, the socket of a ball and socket joint 27. The shafts 25 are provided at each end with the ball of a ball and socket joint. As best seen in FIG. 4, each of these balls has two part-spherical bearing surfaces, one of which, 28a is centered on the axis of the shaft 25, while the other, 28b, is a part-spherical annular surface centered near the end of the shaft 25 and having a diameter equal to that of the cylindrical sockets 24. The balls 28 are seated in the cylindrical sockets 24, with the part-spherical bearing surfaces 28a resting on the bottoms of these sockets and the annular surfaces 28b on their cylindrical walls. If there is no angular displacement the shafts 25 are parallel to XX and the sockets of the ball and socket joints 27, on the levers 26 are centered in the plane of symmetry of the rotatable members.

The levers 26 are caused to bear, through the ball and socket joints 27, without play, on the spherical ends of a rod 29 by resilient means 30, which draw said levers toward each other. As a variation, in FIG. 3 the spherical ends of the rod 29 are enclosed in the sockets themselves. The length of the rod 29 is substantially equal to the distance between the shafts 25, which distance determines the space required to permit rotation of the rotatable members.

An arm 32, the axis of which is substantially identical with the axis XX, is perpendicularly attached to the center of the rod 29. This arm projects into the hollow shaft 19 and the end thereof remote from the rod 29 is connected by a ball and socket joint 32 to the valve member 2 of the distributor 33, the shaft of which is substantially identical to XX.

The assembly 29, 31, forms a three-point lever which converts the displacement of the levers 26 into translational movement of the valve member along the axis XX, accompanied by a rotation about this axis.

The assembly 29, 31 has been shown as a single piece, but may be made from pivotally connected components which permit relative angular displacement about an axis perpendicular to the plane defined by 29, 31.

The valve member of the distributor, depending upon its position, connects one or the other of the chambers of the hydraulic cylinder 34 to a source of fluid pressure 35, the other chamber being connected to a sump, (symbolized by the reservoir 36). The chambers in the cylinder 34 are separated by a piston 40, carried by a rod 41 connected at one end to the rack 16 and at the other to the steering linkage.

It will be noted that the valve member of the distribution valve is hydraulically balanced, so that the lever only needs to overcome frictional resistance. The valve is shown on FIG. 1 in equilibrium position with the two chambers of the hydraulic cylinder isolated from the pressure source and the sump.

The operation of the power steering device will now be described. When an angular displacement in one direction appears between the shafts 4 and 14, the rotatable members 11 and 18 are angularly displaced in a corresponding direction which is amplified in dependence on the ratio between the pinions 16 and 17 on the one hand and 20 and 21 on the other hand. The links formed by the shafts 25 and the ball and socket joints 28 which are, when in equilibrium position, that is to say in the absence of angular displacement, parallel to the axis XX, assume an equal inclination on opposite sides of this axis, which leads to a displacement of the ball and socket joint 27 at the end of each of the levers 26. This displacement consists of a translation along the axis XX and a slight rotation about this same axis. These identical displacements act through the rod 31 to cause a translation of the valve member, accompanied by a slight rotation. This results in a change in the pressure in the chambers of the hydraulic cylinder, which causes translation of the rack, which rotates the pinion 15 on the shaft 14 and drives it in a direction which reduces the angular displacement.

When the angular displacement returns to zero, the valve member is back in the position of FIG. 1.

For a given angular displacement of the rotatable members 11 and 18 the stroke of the valve member is greater to the extent that the ratio between the distance between the centers of the ball and socket joints on the levers in the median plane defined by the shafts 25 and the length of the shafts 25 is greater.

The stroke of the valve member is, moreover, at its optimum, for a given space within which the rotatable members rotate, when the rod 29 is nearly perpendicular to the median plane defined by the axes 25.

It will be noted that, if the balls 28 each have a single spherical bearing surface, an angular displacement between the rotating members introduces a certain play into these sockets in their seats. It is then desirable to provide means for taking up this play, for example, resilient means for biasing each of the rotatable members axially against the other.

This invention provides power steering apparatus which permits the valve member of the distribution valve to have a stroke of substantial length in response to a relatively small rotation of the steering wheel, and this with a minimum of friction, without play, and without such flexing as might diminish the fidelity and precision of control.

The assembly comprising the means for controlling the valve member and the device for returning the wheels to a straight line constitute a single, compact unit which may be incorporated without difficulty into a conventional mechanical control system which may be mounted in various ways upon various types of vehicles to which it may be adapted, regardless of the minimum turning ratio between the steering wheel and the road wheels which must be maintained in order to retain the possibility of manual control in the absence of power assistance.

It follows that the invention is not limited to the particular embodiments which have been described but, on the contrary, embraces all mechanical equivalents thereto. In particular, the hydraulic cylinder 34 may be of the differential type disclosed in U.S. Pat. No. 3,264,946. In this case the valve member 2 is controlled in the same way, but it regulates the pressure in the chamber of the hydraulic cylinder corresponding to the larger active section of the piston, and the other chamber of the hydraulic cylinder is permanently connected to the pressure source.

I claim:

1. In power steering apparatus for a vehicle comprising a manually rotatable steering shaft, steering linkage, and an intermediate shaft connected to actuate said linkage and connected to be rotated by said steering shaft through a lost motion connection permitting limited relative angular displacement between said shafts, fluid pressure responsive actuating means connected to actuate said steering linkage, a source of fluid under pressure, a fluid distributor comprising a valve member mounted for translational movement and connected to control the supply of said fluid under pressure to said actuating means, the transmission means through which said valve member is actuated in response to relative displacement between said shafts, the improvement according to which said transmission means is separate and distinct from said fluid-pressure responsive actuating means and comprises a first rotatable member separate from said shafts and connected to be driven by said steering shaft, a second rotatable member separate from said shafts and connected to be driven by said intermediate shaft about the same axis as said first rotatable member, and means connected between said rotatable members and said valve member for converting relative rotation between said rotatable members into translational movement by said valve member.

2. Apparatus as claimed in claim 1 comprising return means for automatically urging said steering shaft into a position in which the road wheels of said vehicle point straight ahead and which includes a rotatably mounted cam geared to said steering shaft and means for exerting pressure on said cam, said return means and power steering apparatus being enclosed in a common casing.

3. Apparatus as claimed in claim 1 in which said shafts are aligned on a common axis, the axis about which said rotatable members are driven is parallel to said common axis and said rotatable members are driven at the same transmission ratio.

4. Apparatus as claimed in claim 3 in which said valve member is mounted for translation in axial alignment with the axis of said rotatable members, and said rotatable members are connected by at least two pins, each pin being connected at each end to one of said rotatable members by a ball and socket joint, and being provided with a lever projecting transversely therefrom, each lever having an end remote from said pin which is swung when the positions of said pins are changed by relative angular displacement between said rotatable members, and said transmission means comprising means for transmitting to said valve member the component of the movement of said lever ends which is parallel to the direction of translation of said valve member.

5. Apparatus as claimed in claim 4 in which said levers are of equal length, said pins are parallel to the axis of said rotatable members in the absence of relative angular displacement between said rotatable members, and said levers are longer than said pins.

6. Apparatus as claimed in claim 4 in which each pin carries the balls of the ball and socket joints by which it is connected to said rotatable members, and each ball has two part-spherical bearing surfaces one of which surfaces is circular and engages the bottom of the cooperating socket and one of which is annular and engages the peripheral wall of the cooperating socket.

7. Apparatus as claimed in claim 4 in which the end of each lever remote from the pin which carries it pivotally engages one end of a connecting link which actuates said valve member.

8. Apparatus as claimed in claim 7 in which the pivotal connections of said levers to said connecting link are centered in a plane transverse to said pins midway of their length.

9. Apparatus as claimed in claim 7 in which the pivotal connections of the levers to said connecting link lie at the same distance from the axis of said rotatable members as do said pins.

10. Apparatus as claimed in claim 7 in which said connecting link actuates said valve member through a rod which passes through a hollow shaft carrying one of said rotatable members.

11. Apparatus as claimed in claim 10 in which there are two pins and said pins are symmetrically positioned with respect to the axis of said rotatable members.

12. Apparatus as claimed in claim 11 in which said connecting link is pivotally connected to the rod actuating said valve member at a point out of line with its connections to said levers.

* * * * *

UNITED STATES PATENT OFFICE
CERTIFICATE OF CORRECTION

Patent No. 3,791,475    Dated Feb. 12, 1974

Inventor(s) JEAN GEORGES CADIOU

It is certified that error appears in the above-identified patent and that said Letters Patent are hereby corrected as shown below:

Column 6, line 6, Claim 1, "the transmission means" should be changed to read --and transmission means--.

Signed and sealed this 3rd day of December 1974.

(SEAL)
Attest:

McCOY M. GIBSON JR.
Attesting Officer

C. MARSHALL DANN
Commissioner of Patents